(12) United States Patent
Yaramada et al.

(10) Patent No.: US 11,275,785 B2
(45) Date of Patent: Mar. 15, 2022

(54) AI ROUTING FRAMEWORK FOR MULTI-DOMAIN CHATBOTS

(71) Applicant: Jade Global, Inc., San Jose, CA (US)

(72) Inventors: Karan Yaramada, San Jose, CA (US); Adesh Patel, Pune (IN)

(73) Assignee: Jade Global, Inc., San Jose, CA (US)

( * ) Notice: Subject to any disclaimer, the term of this patent is extended or adjusted under 35 U.S.C. 154(b) by 191 days.

(21) Appl. No.: 16/377,081

(22) Filed: Apr. 5, 2019

(65) Prior Publication Data
US 2020/0320133 A1    Oct. 8, 2020

(51) Int. Cl.
| | | |
|---|---|---|
| *G06F 16/00* | (2019.01) | |
| *G06F 16/9032* | (2019.01) | |
| *G06F 16/903* | (2019.01) | |
| *G06N 20/00* | (2019.01) | |
| *G06F 40/30* | (2020.01) | |

(52) U.S. Cl.
CPC .. *G06F 16/90332* (2019.01); *G06F 16/90335* (2019.01); *G06F 40/30* (2020.01); *G06N 20/00* (2019.01)

(58) Field of Classification Search
CPC ......... G06F 16/90332; G06F 16/90335; G06F 40/216; G06F 40/284; G06F 40/30; G06F 40/35; G06N 20/00
USPC ................................................ 707/705–780
See application file for complete search history.

(56) References Cited

U.S. PATENT DOCUMENTS

| | | | | |
|---|---|---|---|---|
| 7,987,176 | B2* | 7/2011 | Latzina | G06F 16/334 |
| | | | | 707/713 |
| 8,335,753 | B2* | 12/2012 | Rappaport | G06N 5/022 |
| | | | | 706/45 |
| 9,589,231 | B2* | 3/2017 | Csurka | G06F 19/00 |
| 9,852,177 | B1* | 12/2017 | Cheung | G06N 7/005 |
| 10,721,190 | B2* | 7/2020 | Zhao | G06N 20/00 |
| 2015/0179168 | A1* | 6/2015 | Hakkani-Tur | G10L 15/22 |
| | | | | 704/257 |
| 2017/0032273 | A1* | 2/2017 | Ho | G06N 20/00 |
| 2018/0053116 | A1* | 2/2018 | Cai | G06F 16/353 |
| 2018/0365579 | A1* | 12/2018 | Wan | G06N 5/046 |
| 2020/0104395 | A1* | 4/2020 | Bhatia | G06N 3/0472 |
| 2020/0159997 | A1* | 5/2020 | Wu | G06N 3/0427 |
| 2020/0226288 | A1* | 7/2020 | Zhang | G06N 3/04 |
| 2020/0320978 | A1* | 10/2020 | Chatterjee | G10L 15/1822 |

* cited by examiner

*Primary Examiner* — Michelle N Owyang
(74) *Attorney, Agent, or Firm* — Fountainhead Law Group P.C.

(57) ABSTRACT

An AI routing framework for a multi-domain chatbot is provided. According to one set of embodiments, a computer system implementing the AI routing framework can receive a user query/request submitted to the multi-domain chatbot, determine an input statement corresponding to the user query/request, and calculate an embedding of the input statement reflecting the input statement's semantic content. The computer system can further identify, from among a plurality of statement embeddings maintained in a repository, a statement embedding that most closely matches the embedding of the input statement, and determine a domain associated with the identified statement embedding in the repository. The computer system can then forward the input statement to a handler of a back-end software system configured to process user queries/requests belonging to the determined domain.

21 Claims, 8 Drawing Sheets

AI ROUTING FRAMEWORK FOR MULTI-DOMAIN CHATBOTS

BACKGROUND

A "chatbot" is a software program that is capable of engaging in simulated conversation, via either an auditory or textual interface, with human users. Examples of chatbots include voice-based virtual assistants such as Ski, Alexa, etc., text-based interactive agents, and so on. In an enterprise, chatbots are commonly deployed to enable users to interact with the enterprise's back-end software systems in a self-service manner. As used herein, a "back-end software system" is a software system, application, or group of systems/applications that comprises logic and storage for carrying out one or more computing or business functions (e.g., human resources (HR), customer relationship management (CRM), information technology services management (ITSM), etc.). For example, an enterprise user may submit to a chatbot a verbal or text-based query/request to ask for vacation days, report a technical problem with his/her laptop, inquire about his/her benefits, or the like. In response, the chatbot (or a server component thereof) will parse the query/request, invoke an appropriate handler of a back-end software system to process the query/request, and return a response to the user.

One limitation with existing chatbots in the enterprise space is that each chatbot is generally designed to interoperate with a single type of back-end software system. For example, Oracle Corporation provides a chatbot that can only interoperate with Oracle Fusion-based systems. Similarly, SalesForce provides a chatbot that can only interoperate with SalesForce systems. Because of this limitation, an enterprise must deploy, and its users must learn to use, multiple different chatbots if the enterprise makes use of multiple different back-ends (e.g., an Oracle system for HR, a SalesForce system for CRM, etc.). This is burdensome for users and increases the costs and complexity of the enterprise's IT infrastructure.

SUMMARY

An AI routing framework for a multi-domain chatbot is provided. According to one set of embodiments, a computer system implementing the AI routing framework can receive a user query/request submitted to the multi-domain chatbot, determine an input statement corresponding to the user query/request, and calculate an embedding of the input statement reflecting the input statement's semantic content. The computer system can further identify, from among a plurality of statement embeddings maintained in a repository, a statement embedding that most closely matches the embedding of the input statement, and determine a domain associated with the identified statement embedding in the repository. The computer system can then forward the input statement to a handler of a back-end software system configured to process user queries/requests belonging to the determined domain.

The following detailed description and accompanying drawings provide a better understanding of the nature and advantages of particular embodiments.

DETAILED DESCRIPTION

In the following description, for purposes of explanation, numerous examples and details are set forth in order to provide an understanding of various embodiments. It will be evident, however, to one skilled in the art that certain embodiments can be practiced without some of these details, or can be practiced with modifications or equivalents thereof.

1. Overview

Embodiments of the present disclosure are directed to an artificial intelligence (AI) based routing framework for a "multi-domain" chatbot—in other words, a chatbot that can accept user queries/requests pertaining to multiple different domains, where each domain corresponds to a particular computing/business function or related set of computing/business functions. For example, in an enterprise context, such domains may include HR, CRM, ITSM, and so on.

At a high level, the AI routing framework can receive a user query/request submitted to the multi-domain chatbot, pre-process the query/request to determine an input statement represented by the query/request, calculate a mathematical representation (referred to as an "embedding") of the input statement, and compare the calculated embedding to the embeddings of example statements (pertaining to various different domains) stored within a framework repository. Based on this comparison, the AI routing framework can match the input statement to an example statement in the repository that is most semantically similar to the input statement. The AI routing framework can then extract, from the repository, information associated with the matched statement (including, e.g., a domain to which the matched statement belongs) and forward the input statement to a handler of particular back-end software system that is configured to process the domain associated with the matched statement.

With the general approach described above, the AI routing framework can efficiently and accurately route user queries/requests submitted to the multi-domain chatbot to appropriate back-end software systems based on their respective domains. For example, if the AI routing framework determines that the input statement for a first query/request submitted to the multi-domain chatbot most closely matches a stored statement belonging to the HR domain, the framework can forward the input statement to the handler of an Oracle-based back-end system that is specifically configured to process HR-related queries/requests. As another example, if the AI routing framework determines that the input statement for a second query/request submitted to the multi-domain chatbot most closely matches a stored statement belonging to the CRM domain, the framework can forward the input statement to the handler of a SalesForce-based back-end system that is specifically configured to process CRM-related queries/requests.

The foregoing has several benefits—first, it allows users to use a single chatbot interface (i.e., the multi-domain chatbot) for submitting queries/requests across a multitude of different domains, rather than using a separate chatbot for each domain. Second, since each back-end software system only receives the input statements that are deemed appropriate for that system per the AI routing framework, each back-end system can implement a handler (e.g., a machine learning model) that is highly optimized for the domain of that system.

The foregoing and other aspects of the present disclosure are described in further detail in the sections that follow.

2. System Environment

Figure 1:
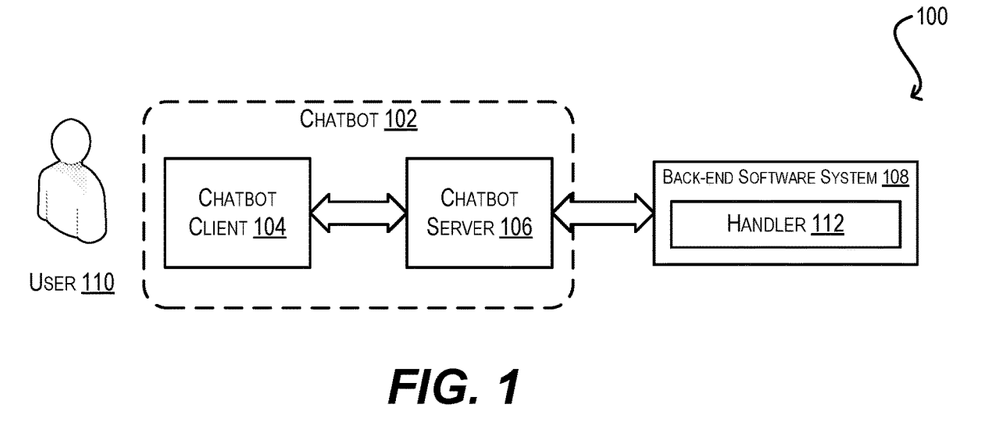
FIG. 1 depicts a system environment comprising a conventional chatbot that is connected to a single back-end software system.

To provide context for the embodiments described herein, FIG. 1 depicts a system environment 100 that includes a conventional chatbot 102 (comprising a chatbot client 104 and a chatbot server 106) which is directly connected to a single back-end software system 108. Chatbot client 104, which may run on an end-user device such as a desktop computer, laptop computer, smartphone, tablet, etc., is operated by a user 110. Although only a single chatbot client is shown for ease of explanation, it should be appreciated that chatbot 102 may support multiple concurrent clients (each operated by a different user).

In practice, user 110 can submit, via chatbot client 104, a query/request to take some action with respect to, or acquire information from, back-end software system 108. For example, if system 108 is an HR system, user 110 may submit a query/request such as "I would like to take vacation for the period of December 23 to January 2." The particular modality of this request may be verbal or text-based and will depend on the type of user interface exposed by chatbot client 104.

Upon receiving the request, chatbot client 104 can forward it to chatbot server 106, which in turn can invoke an appropriate handler 112 exposed by back-end software system 108. Handler 112/back-end software system 108 can then process the request and generate a response (e.g., vacation request accepted or denied), which can be communicated back to chatbot client 104 via chatbot server 106 and presented to user 110.

As mentioned previously, one limitation with conventional chatbots such as chatbot 102 of FIG. 1 is that they are generally designed to interoperate with only a single type of back-end software system (e.g., system 108). For large enterprises that implement multiple different back-end software systems, potentially from different software vendors (e.g., one system from Oracle, another from SalesForce, etc.), this means that those enterprises must deploy multiple chatbots in order to provide self-service chatbot access across their various back-end software systems, which can be costly and burdensome.

Figure 2:
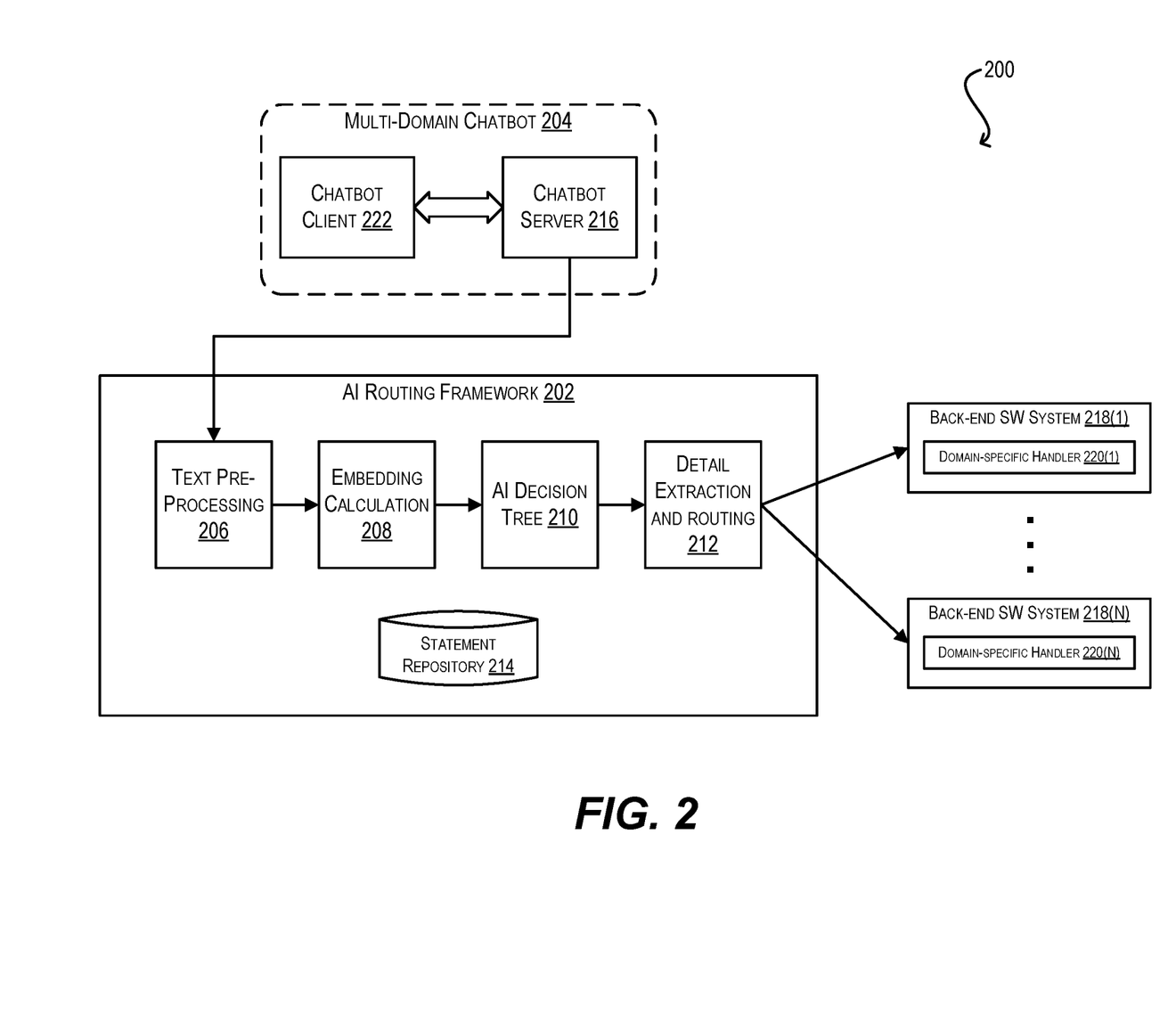
FIG. 2 depicts a system environment comprising a multi-domain chatbot that is connected to multiple different back-end software systems via an AI routing framework according to an embodiment.

To address the foregoing and other similar issues, FIG. 2 depicts a system environment 200 that includes a novel AI routing framework 202 for a multi-domain chatbot 204 according to an embodiment. As shown, AI routing framework 202 (which includes a text preprocessing component 206, an embedding calculation component 208, an AI decision tree component 210, a detail extraction and routing component 212, and a statement repository 214) is connected to chatbot server 216 of multi-domain chatbot 204 on one end and to multiple different back-end software systems 218(1)-(N) on the other end. Each back-end software system 218(1)-(N) comprises a domain-specific handler 220 that is configured to process user queries/requests for a particular domain, where a domain is a computing/business function or a set of related computing/business functions. For example, in the scenario where AI routing framework 202 and multi-domain chatbot 204 are implemented in an enterprise, domain-specific handler 220 of each back-end software system 218 may be configured to process user queries/requests pertaining to a particular back-office business function within the enterprise such as HR, CRM, ITSM, and the like.

As described in further detail below, AI routing framework 202 can receive user queries/requests across different domains which are submitted to multi-domain chatbot 204 and can intelligently route these queries/requests to back-end software systems 218(1)-(N) in a manner that ensures user queries/requests belonging to a domain D are sent to the domain-specific handler of a back-end software system is that designed to process (i.e., is an expert for) statements in domain D. This mechanism avoids the need for users to rely on multiple different chatbots in order to submit queries/requests across different domains; instead, users can submit all of their cross-domain queries/requests to multi-domain chatbot 204, and AI routing framework 202 can take care of figuring out which domain-specific handler is best suited for processing each query/request. In one set of embodiments, AI routing framework 202 can perform this task by matching a mathematical representation (i.e., embedding) of each incoming query/request indicating its semantic content to corresponding mathematical representations of example statements stored in statement repository 214, which results in efficient and relatively accurate domain classification for each query/request.

Further, in cases where domain-specific handlers 220(1)-(N) of back-end software systems 218(1)-(N) are machine learning models, this routing mechanism advantageously reduces the training data requirements for each model (because each handler will only receive input statements deemed appropriate by the routing framework). This results in smaller model sizes and thus better performance and resource utilization at each back-end software system 218.

It should be appreciated that system environment 200 of FIG. 2 is illustrative and not intended to limit embodiments of the present disclosure. For example, although AI routing framework 202 is depicted as being separate and distinct from multi-domain chatbot 204, in certain embodiments the functionality of AI routing framework 202 may be incorporated into multi-domain chatbot 204 or one or more of its components. Further, the various entities shown in FIG. 2 may include sub-components or functions that are not specifically described. One of ordinary skill in the art will recognize other variations, modifications, and alternatives.

3. High-Level Workflow

Figure 3:
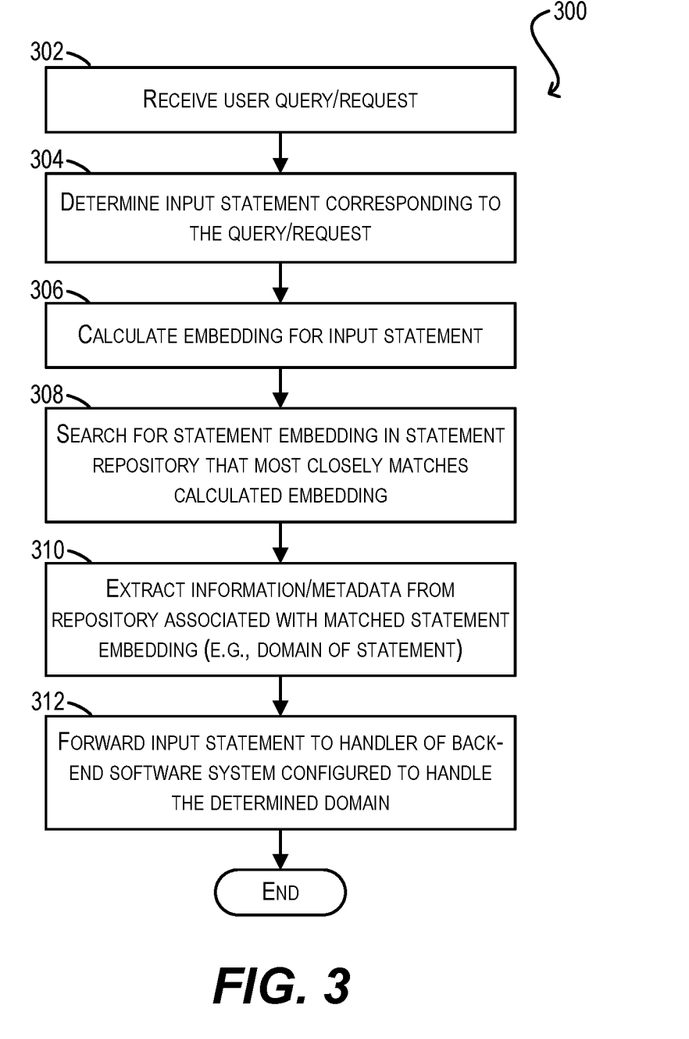
FIG. 3 depicts a high-level workflow that may be performed by the AI routing framework of FIG. 2 for processing a user query/request according to an embodiment.

FIG. 3 depicts a high-level workflow 300 that may be executed by AI routing framework 202 of FIG. 2 and its constituent components for processing a user query/request submitted via multi-domain chatbot 204 according to an embodiment.

Starting with block 302, AI routing framework 202 can receive, from chatbot server 216 of multi-domain chatbot 204, a query/request originating from a user and submitted via chatbot client 222. This query/request may correspond to, e.g., an informational inquiry, a command to execute some action, a request for authorization to execute some action, a submission of information, etc. and may pertain to any one of a plurality of different domains supported by multi-domain chatbot 204. For instance, if multi-domain chatbot 204 is a chatbot in an enterprise for enabling self-service access to the enterprise's various internal business systems/applications, the user query/request received at block 302 may pertain to any one of a plurality of different business domains handled by those disparate systems/applications (e.g., HR, CRM, ITSM, payroll, etc.). Further, the query/request may be a verbal or text-based query/request, depending on the type of user interface exposed by chatbot client 222.

At block 304, AI routing framework 202 can (via, e.g., text pre-processing component 206) pre-process the user query/request to determine an "input statement" corresponding to the query/request. In various embodiments, this input statement is a text string that reflects the semantically significant content of the query/request (e.g., the query/request stripped of emojis, special characters, etc.).

AI routing framework 202 can then calculate (via, e.g., embedding calculation component 208) a mathematical representation of the input statement, referred to as an embedding (block 306), and search (via, e.g., AI decision tree component 210) for a corresponding statement embedding maintained in statement repository 214 that most closely matches the embedding calculated at block 306 (block 308). In various embodiments, it is assumed that statement repository 214 includes statement embeddings and additional associated information/metadata for a corpus of exemplary (i.e., trained) statements that may be, and/or have been, submitted to multi-domain chatbot 204. Thus, the search operation at block 308 essentially finds an example/trained statement in repository 214 that is most semantically similar to the input statement (i.e., most likely carries the same meaning).

Upon finding the most closely matched statement embedding at block 308, AI routing framework 202 can (via, e.g., detail extraction and routing component 212) extract from statement repository 214 the information/metadata associated with the matched statement embedding (block 310). This information/metadata can include, among other things, an identifier of a domain to which the statement embedding belongs, the identifier of a particular back-end system handler that is configured to processing queries/requests within that domain, and so on.

Finally, at block 312, AI routing framework 202 can forward the input statement to an appropriate domain-specific handler 220 of an appropriate back-end software system 218 (as determined from the information/metadata extracted at block 310) for further processing. In this way, AI routing framework 202 can ensure that the input statement is sent to the handler/back-end software system that is specifically designed for handling queries/requests within the input statement's domain.

The remaining sections of this disclosure provide additional details for implementing each of the high-level operations described above according to certain embodiments. It should be appreciated that workflow 300 is illustrative and various modifications are possible. For example, although not specifically shown, in some embodiments AI routing framework 202 can add the input statement and its embedding to statement repository 214 upon determining its appropriate domain and appropriate handler/back-end software system at block 310. In this manner, AI routing framework 202 can increase the corpus of embeddings maintained in statement repository 214 and thereby improve the overall accuracy and performance of the framework.

Further, if AI routing framework 202 determines at block 308 that there is no statement embedding in statement repository 214 that is reasonably close to (i.e., within a certain threshold distance of) the calculated embedding of the input statement, in some embodiments AI routing framework 202 can flag the input statement for review by, e.g., a human administrator. The human administrator can then take a look at the input statement, determine an appropriate domain/handler for the input statement based on his/her judgement, and add the input statement (along with its embedding/domain/handler/etc.) to statement repository 214, thereby enabling the framework to successfully route that input statement the next time it is encountered.

4. Text Pre-Processing Workflow

Figure 4:
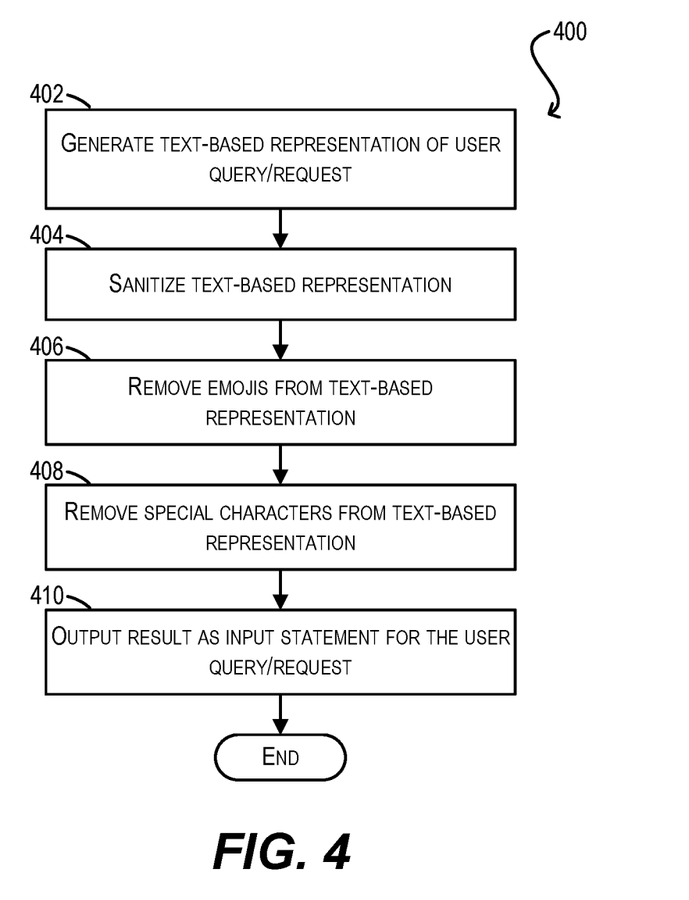
FIG. 4 depicts a text preprocessing workflow that may be performed by the AI routing framework of FIG. 2 according to an embodiment.

FIG. 4 depicts a workflow 400 that can be performed by text pre-processing component 206 of AI routing framework 202 for implementing block 304 of high-level workflow 300 according to an embodiment.

At block 402, text pre-processing component 206 can generate a text-based representation of the user query/request received at block 402 of workflow 300. In scenarios where the user query/request was originally submitted verbally by a user, this step can comprise applying a speech recognition algorithm to the query/request in order to convert it into a textual form. In scenarios where the user query/request was originally submitted as text, this step can be omitted.

At block 404, text pre-processing component 206 can sanitize the text-based representation be, e.g., removing any words or phrases that are included in a pre-defined blacklist. This blacklist may include words/phrases are that are deemed offensive or irrelevant to the domains supported by multi-domain chatbot 204. In addition, at blocks 406 and 408, text pre-processing component 206 can remove emojis and special characters (e.g., @, #, $, etc.) that do not significantly contribute to the semantic content of the query/request.

Finally, at block 410, text pre-processing component 206 can output the processed text-based representation as the input statement for the query/request and workflow 400 can end.

5. Embedding Calculation Workflow

Figure 5:
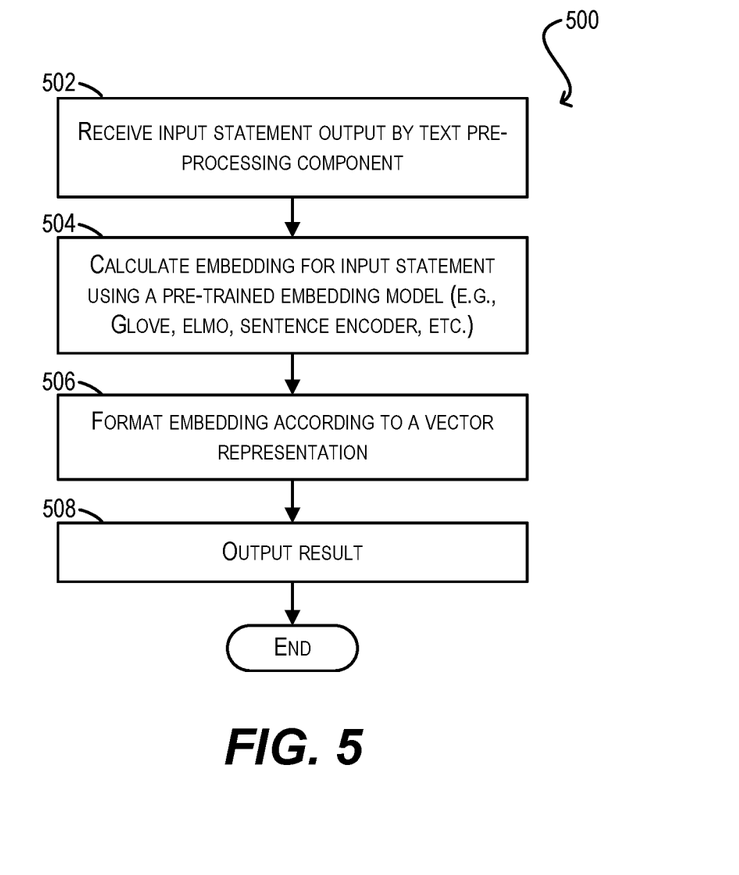
FIG. 5 depicts an input statement embedding calculation workflow that may be performed by the AI routing framework of FIG. 2 according to an embodiment.

FIG. 5 depicts a workflow 500 that can be performed by embedding calculation component 208 of AI routing framework 202 for implementing block 306 of high-level workflow 300 according to an embodiment.

Starting with block 502, embedding calculation component 208 can receive the input statement output by text pre-processing component 206 per workflow 400. Then, at block 504, embedding calculation component 208 can calculate the embedding for the input statement by applying one of a number of pre-trained embedding models (e.g., Glove, elmo, sentence encoder, etc.). In various embodiments, these embedding models are designed to convert the text of the input statement into a multi-dimensional vector that represents the semantic content of that text.

Once the embedding has been calculated, component 208 can format the embedding according to a vector representation (block 506), output the result (block 508), and terminate the workflow.

6. AI Decision Tree Workflow

Figure 6:
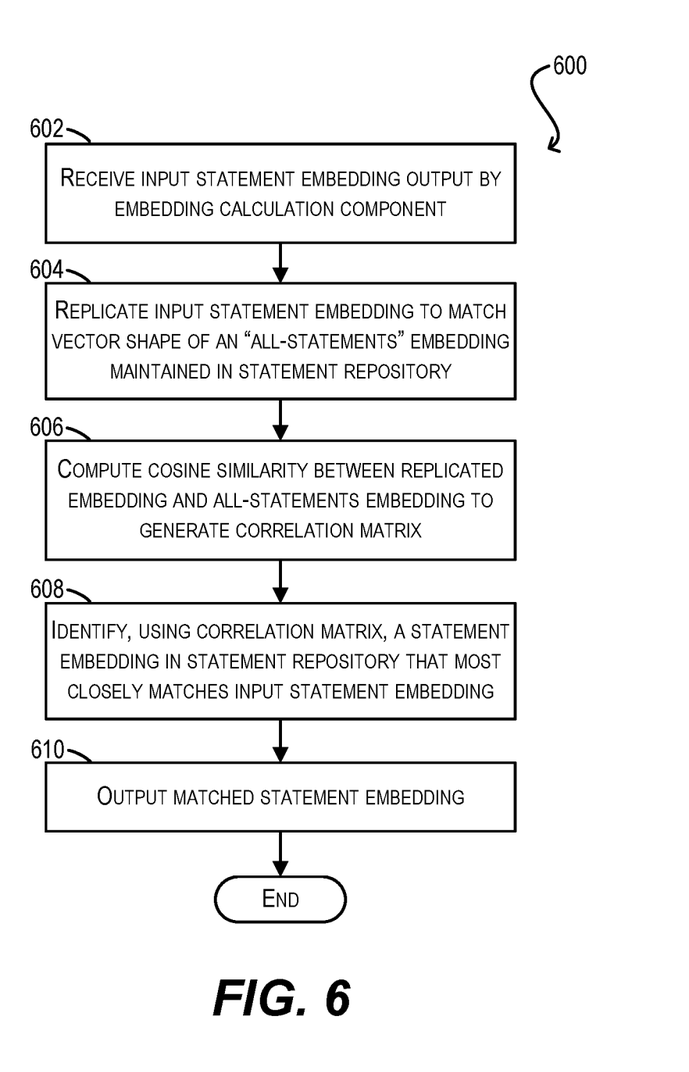
FIG. 6 depicts an AI decision tree workflow that may be performed by the AI routing framework of FIG. 2 according to an embodiment.

FIG. 6 depicts a workflow 600 that can be performed by AI decision tree component 210 of AI routing framework 202 for implementing block 308 of high-level workflow 300 according to an embodiment.

At blocks 602 and 604, AI decision tree component 210 can receive the input statement embedding output by embedding calculation component 208 per workflow 500 and can replicate the embedding to match the vector shape of an "all-statements" embedding stored in repository 214, where the all-statements embedding is a mathematical representation of all of the statements maintained in repository 214.

At block 606, AI decision tree component 210 can compute the cosine similarity between the replicated input statement embedding and the all-statements embedding. In various embodiments, the result of this step is a correlation matrix, which is a table comprising correlation coefficients between the input statement embedding and the various statement embeddings in statement repository 214.

Once the correlation matrix has been created, AI decision tree component 210 can identify, using the correlation matrix, the statement embedding in repository 214 that most closes matches the input statement embedding (block 608). This step can comprise identifying the statement embedding that is associated with the highest correlation coefficients in the correlation matrix.

Finally, at block 610, AI decision tree component 210 can output the matched statement embedding and workflow 600 can end.

7. Detail Extraction and Routing Workflow

Figure 7:
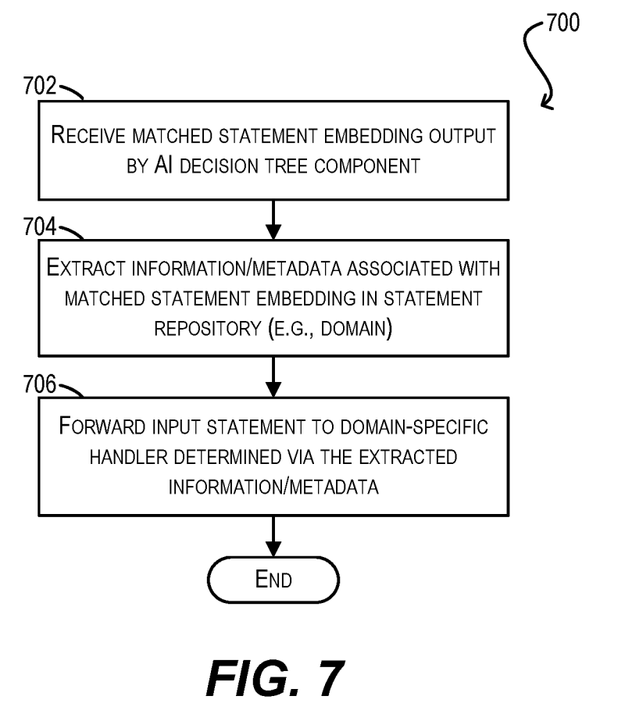
FIG. 7 depicts a detail extraction and routing workflow that may be performed by the AI routing framework of FIG. 2 according to an embodiment.

FIG. 7 depicts a workflow 700 that can be performed by detail extraction and routing component 212 of AI routing framework 202 for implementing blocks 310 and 312 of high-level workflow 300 according to an embodiment.

At block 702, detail extraction and routing component 212 can receive the matched statement embedding output by AI decision tree component 210 per workflow 600. In response, component 212 can extract the information/metadata stored with the matched statement embedding in statement repository 214 (block 704). As mentioned previously, this information/metadata can include, e.g., the domain to which the statement embedding belongs and the identity of a domain-specific handler 220 that is configured to handle queries/requests failing within that domain.

Detail extraction and routing component 212 can then forward the input statement to the domain-specific handler determined via the extracted information/metadata for further processing (block 706) and workflow 700 can end.

8. Example Computer System

Figure 8:
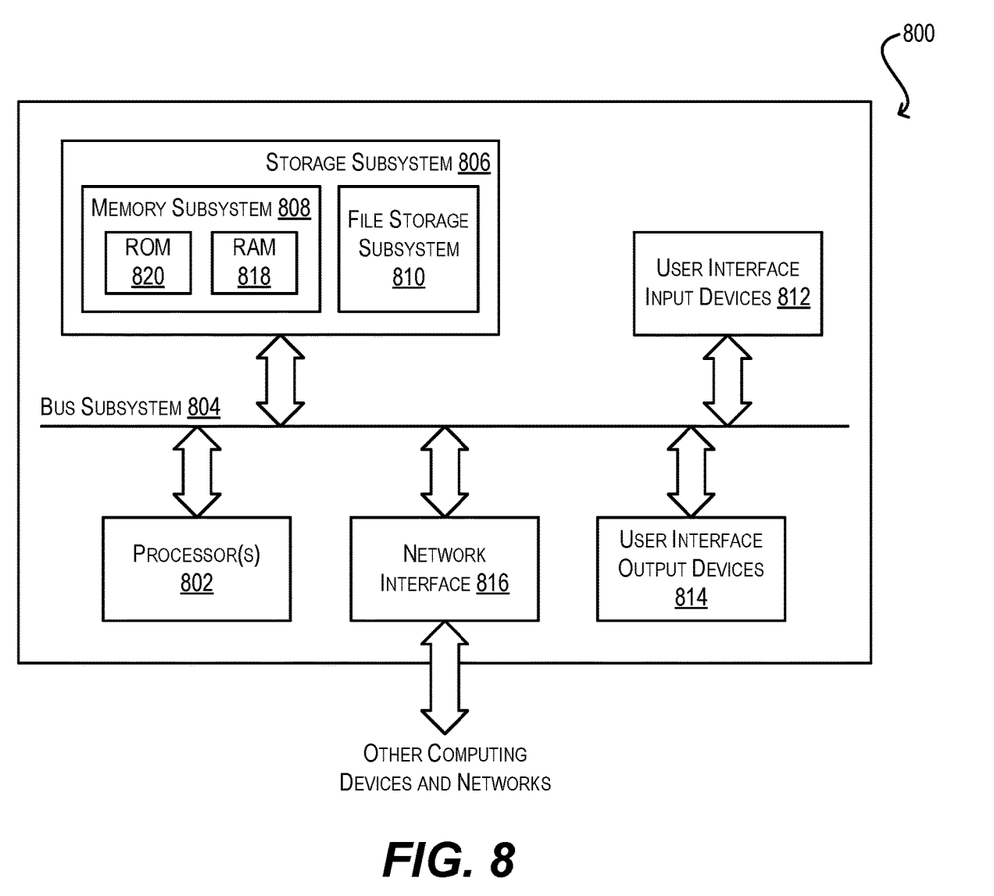
FIG. 8 depicts an example computer system according to an embodiment.

FIG. 8 is a simplified block diagram of an example computer system 800 according to an embodiment. In various embodiments, computer system 800 can be used to implement AI routing framework 202, multi-domain chatbot 204, and/or a combination of the two. As shown in FIG. 8, computer system 800 includes one or more processors 802 that communicate with a number of peripheral devices via a bus subsystem 804. These peripheral devices can include a storage subsystem 806 (comprising a memory subsystem 808 and a file storage subsystem 810), user interface input devices 812, user interface output devices 814, and a network interface subsystem 816.

Bus subsystem 804 can provide a mechanism for letting the various components and subsystems of computer system 800 communicate with each other as intended. Although bus subsystem 804 is shown schematically as a single bus, alternative embodiments of the bus subsystem can utilize multiple buses.

Network interface subsystem 816 can serve as an interface for communicating data between computer system 800 and other computing devices or networks. Embodiments of network interface subsystem 816 can include wired (e.g., coaxial, twisted pair, or fiber optic Ethernet) and/or wireless (e.g., Wi-Fi, cellular, Bluetooth, etc.) interfaces.

User interface input devices 812 can include a keyboard, pointing devices (e.g., mouse, trackball, touchpad, etc.), a scanner, a barcode scanner, a touch-screen incorporated into a display, audio input devices (e.g., voice recognition systems, microphones, etc.), and other types of input devices. In general, use of the term "input device" is intended to include all possible types of devices and mechanisms for inputting information into computer system 800.

User interface output devices 814 can include a display subsystem, a printer, or non-visual displays such as audio output devices, etc. The display subsystem can be a cathode ray tube (CRT), a flat-panel device such as a liquid crystal display (LCD), or a projection device. In general, use of the term "output device" is intended to include all possible types of devices and mechanisms for outputting information from computer system 800.

Storage subsystem 806 can include a memory subsystem 808 and a file/disk storage subsystem 810. Subsystems 808 and 810 represent non-transitory computer-readable storage media that can store program code and/or data that provide the functionality of various embodiments described herein.

Memory subsystem 808 can include a number of memories including a main random access memory (RAM) 818 for storage of instructions and data during program execution and a read-only memory (ROM) 820 in which fixed instructions are stored. File storage subsystem 810 can provide persistent (i.e., non-volatile) storage for program and data files and can include a magnetic or solid-state hard disk drive, an optical drive along with associated removable media (e.g., CD-ROM, DVD, Blu-Ray, etc.), a removable flash memory-based drive or card, and/or other types of storage media known in the art.

It should be appreciated that computer system 800 is illustrative and not intended to limit embodiments of the present disclosure. Many other configurations having more or fewer components than computer system 800 are possible.

The above description illustrates various embodiments of the present disclosure along with examples of how aspects of the present disclosure may be implemented. The above examples and embodiments should not be deemed to be the only embodiments, and are presented to illustrate the flexibility and advantages of the present disclosure as defined by the following claims. For example, although certain embodiments have been described with respect to particular process flows and steps, it should be apparent to those skilled in the art that the scope of the present disclosure is not strictly limited to the described flows and steps. Steps described as sequential may be executed in parallel, order of steps may be varied, and steps may be modified, combined, added, or omitted. As another example, although certain embodiments have been described using a particular combination of hardware and software, it should be recognized that other combinations of hardware and software are possible, and that specific operations described as being implemented in software can also be implemented in hardware and vice versa.

The specification and drawings are, accordingly, to be regarded in an illustrative rather than restrictive sense. Other arrangements, embodiments, implementations and equivalents will be evident to those skilled in the art and may be employed without departing from the spirit and scope of the present disclosure as set forth in the following claims.

What is claimed is:

1. A method comprising:
   receiving, by a computer system, a user query or request submitted to a multi-domain chatbot, the multi-domain chatbot being configured to accept user queries and requests pertaining to a plurality of domains, each domain in the plurality of domains corresponding to a computing or business function of an enterprise;
   determining, by the computer system, an input statement corresponding to the user query or request;
   calculating, by the computer system, an embedding of the input statement reflecting semantic content of the input statement;
   matching, by the computer system the embedding of the input statement to a statement embedding in a plurality of statement embeddings maintained in a repository, the matching comprising:
     replicating the embedding of the input statement to match a vector shape of an all-statements embedding maintained the repository, the all-statements embedding being a single mathematical representation of the plurality of statement embeddings;
     computing a cosine similarity between the replicated embedding of the input statement and the all-statements embedding;
     based on the computing, creating a correlation matrix including correlation coefficients between the embedding of the input statement and the plurality of statement embeddings; and
     determining that the statement embedding is associated with the highest correlation coefficients in the correlation matrix;
   extracting, by the computer system from the repository, metadata associated with the statement embedding, the metadata including an identifier of a domain in the plurality of domains to which the statement embedding belongs and an identifier of a handler of a back-end software system of the enterprise configured to process user queries and requests belonging to the domain; and
   forwarding, by the computer system, the input statement to the handler.

2. The method of claim 1 wherein determining the input statement comprises:
   generating a text-based representation of the user query or request;
   removing, from the text-based representation, words or phrases included in a predefined blacklist; and
   removing, from the text-based representation, emojis and special characters.

3. The method of claim 1 wherein the embedding is a multi-dimensional vector representation of the input statement, and wherein calculating the embedding comprises applying a pre-trained embedding model.

4. The method of claim 1 wherein the handler of the back-end software system is a machine learning model that is optimized to respond to user queries and requests belonging to the domain.

5. The method of claim 1 wherein the plurality of domains include a human resources function and an information technology services management function of the enterprise.

6. The method of claim 1 wherein upon receiving the input statement, the handler:
   generates a response to the input statement; and
   provides the response to the multi-domain chatbot for communication to an originator of the user query or request.

7. The method of claim 1 further comprising, subsequently to forwarding the input statement to the handler:
   adding the input statement, the embedding of the input statement, the domain of the input statement, and the identifier of the handler to the repository.

8. A non-transitory computer readable storage medium having stored thereon program code executable by a computer system, the program code comprising:
   code that causes the computer system to receive a user query or request submitted to a multi-domain chatbot, the multi-domain chatbot being configured to accept user queries and requests pertaining to a plurality of domains, each domain in the plurality of domains corresponding to a computing or business function of an enterprise;
   code that causes the computer system to determine an input statement corresponding to the user query or request;
   code that causes the computer system to calculate an embedding of the input statement reflecting semantic content of the input statement;
   code that causes the computer system to match, the embedding of the input statement to a statement embedding in a plurality of statement embeddings maintained in a repository, the matching comprising:
     replicating the embedding of the input statement to match a vector shape of an all-statements embedding maintained the repository, the all-statements embedding being a single mathematical representation of the plurality of statement embeddings;
     computing a cosine similarity between the replicated embedding of the input statement and the all-statements embedding;
     based on the computing, creating a correlation matrix including correlation coefficients between the embedding of the input statement and the plurality of statement embeddings; and
     determining that the statement embedding is associated with the highest correlation coefficients in the correlation matrix;
   code that causes the computer system to extract, from the repository, metadata associated with the statement embedding, the metadata including an identifier of a domain in the plurality of domains to which the statement embedding belongs and an identifier of a handler of a back-end software system of the enterprise configured to process user queries and requests belonging to the domain; and
   code that causes the computer system to forward the input statement to the handler.

9. The non-transitory computer readable storage medium of claim 8 wherein the code that causes the computer system to determine the input statement comprises:

code that causes the computer system to generate a text-based representation of the user query or request;

code that causes the computer system to remove, from the text-based representation, words or phrases included in a predefined blacklist; and code that causes the computer system to remove, from the text-based representation, emojis and special characters.

10. The non-transitory computer readable storage medium of claim 8 wherein the embedding is a multi-dimensional vector representation of the input statement, and wherein the code that causes the computer system to calculate the embedding comprises code that causes the computer system to apply a pre-trained embedding model.

11. The non-transitory computer readable storage medium of claim 8 wherein the handler of the back-end software system is a machine learning model that is optimized to respond to user queries and requests belonging to the domain.

12. The non-transitory computer readable storage medium of claim 8 wherein the plurality of domains include a human resources function and an information technology services management function of the enterprise.

13. The non-transitory computer readable storage medium of claim 8 wherein upon receiving the input statement, the handler:

generates a response to the input statement; and provides the response to the multi-domain chatbot for communication to an originator of the user query or request.

14. The non-transitory computer readable storage medium of claim 8 wherein the program code further comprises, subsequently to forwarding the input statement to the handler:

code that causes the computer system to add the input statement, the embedding of the input statement, the domain of the input statement, and the identifier of the handler to the repository.

15. A computer system comprising:

a processor; and a non-transitory computer readable medium having stored thereon program code that, when executed by the processor, causes the processor to:

receive a user query or request submitted to a multi-domain chatbot, the multi-domain chatbot being configured to accept user queries and requests pertaining to a plurality of domains, each domain in the plurality of domains corresponding to a computing or business function of an enterprise;

determine an input statement corresponding to the user query or request;

calculate an embedding of the input statement reflecting semantic content of the input statement;

match the embedding of the input statement to a statement embedding in a plurality of statement embeddings maintained in a repository, the matching comprising:

replicating the embedding of the input statement to match a vector shape of an all-statements embedding maintained the repository, the all-statements embedding being a single mathematical representation of the plurality of statement embeddings;

computing a cosine similarity between the replicated embedding of the input statement and the all-statements embedding;

based on the computing, creating a correlation matrix including correlation coefficients between the embedding of the input statement and the plurality of statement embeddings; and determining that the statement embedding is associated with the highest correlation coefficients in the correlation matrix;

extract, from the repository, metadata associated with the statement embedding, the metadata including an identifier of a domain in the plurality of domains to which the statement embedding belongs and an identifier of a handler of a back-end software system of the enterprise configured to process user queries and requests belonging to the domain; and forward the input statement to the handler.

16. The computer system of claim 15 wherein the program code that causes the processor to determine the input statement comprises program code that causes the processor to:

generate a text-based representation of the user query or request;

remove, from the text-based representation, words or phrases included in a predefined blacklist; and remove, from the text-based representation, emojis and special characters.

17. The computer system of claim 15 wherein the embedding is a multi-dimensional vector representation of the input statement, and wherein the program code that causes the processor to calculate the embedding comprises program code that causes the processor to apply a pre-trained embedding model.

18. The computer system of claim 15 wherein the handler of the back-end software system is a machine learning model that is optimized to respond to user queries and requests belonging to the domain.

19. The computer system of claim 15 wherein the plurality of domains include a human resources function and an information technology services management function of the enterprise.

20. The computer system of claim 15 wherein upon receiving the input statement, the handler:

generates a response to the input statement; and provides the response to the multi-domain chatbot for communication to an originator of the user query or request.

21. The computer system of claim 15 wherein the program code further causes the processor to, subsequently to forwarding the input statement to the handler:

add the input statement, the embedding of the input statement, the domain of the input statement, and the identifier of the handler to the repository.

* * * * *